United States Patent [19]
Mitchell

[11] Patent Number: 5,911,947
[45] Date of Patent: Jun. 15, 1999

[54] FAN-FOLDED POLYMER-ELECTROLYTE CELL

[75] Inventor: Nathan Mitchell, The Woodlands, Tex.

[73] Assignee: Compaq Computer Corporation, Houston, Tex.

[21] Appl. No.: 08/885,250

[22] Filed: Jun. 30, 1997

[51] Int. Cl.⁶ ..................................................... H01M 6/18
[52] U.S. Cl. .......................... 29/623.2; 29/623.1; 429/245
[58] Field of Search ................................ 29/623.2, 623.1; 429/124, 245

[56] References Cited

U.S. PATENT DOCUMENTS

| | | |
|---|---|---|
| 3,663,721 | 5/1972 | Blondel et al. . |
| 4,761,352 | 8/1988 | Bakos et al. . |
| 4,929,519 | 5/1990 | Catotti . |
| 5,030,523 | 7/1991 | Neat et al. . |
| 5,035,965 | 7/1991 | Sangyoji et al. . |
| 5,470,357 | 11/1995 | Schmutz et al. . |
| 5,552,239 | 9/1996 | Gozdz et al. . |
| 5,618,318 | 4/1997 | Reddy et al. . |
| 5,693,105 | 12/1997 | Kawakami . |

OTHER PUBLICATIONS

Tarascon et al., "The Li–Ion Technology: Its Evolution from Liquid to Plastic", Material Research Society, pp. 595–603, (no month) 1995.

Schmutz, C., "A New Rechargeable Plastic Li–Ion Battery", The Electrochemical Society Proceedings, vol. 94–28, pp. 330–335, (no month) 1995.

*Primary Examiner*—John S. Maples
*Attorney, Agent, or Firm*—Robert Groover; Matthew Anderson

[57] ABSTRACT

A method for fan-folding lithium-ion-polymer battery cells, wherein gaps are left in the active material at fold locations of the metallic backing conductor. This avoids fatigue at the fold locations when the active materials expand and contract during charge and discharge.

14 Claims, 3 Drawing Sheets

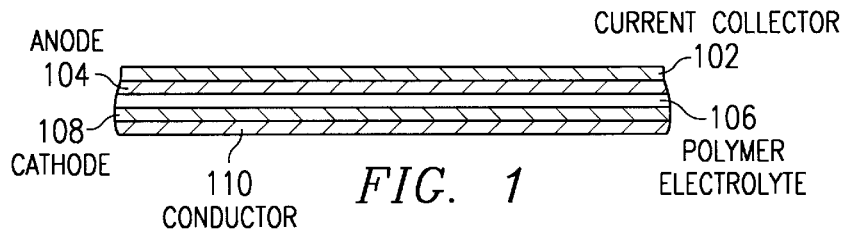
FIG. 1
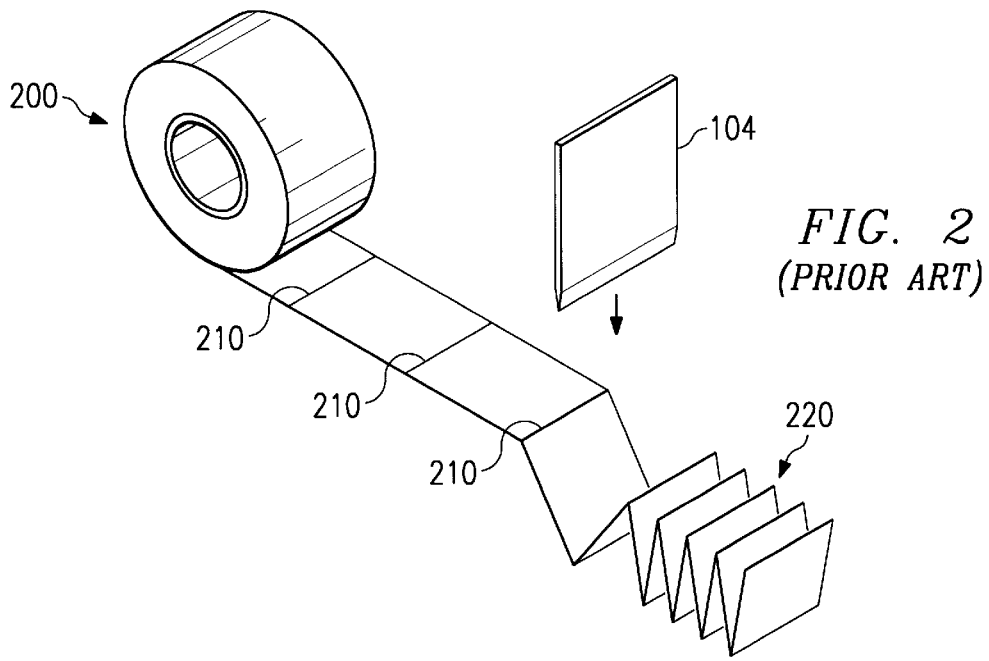
FIG. 2
(PRIOR ART)
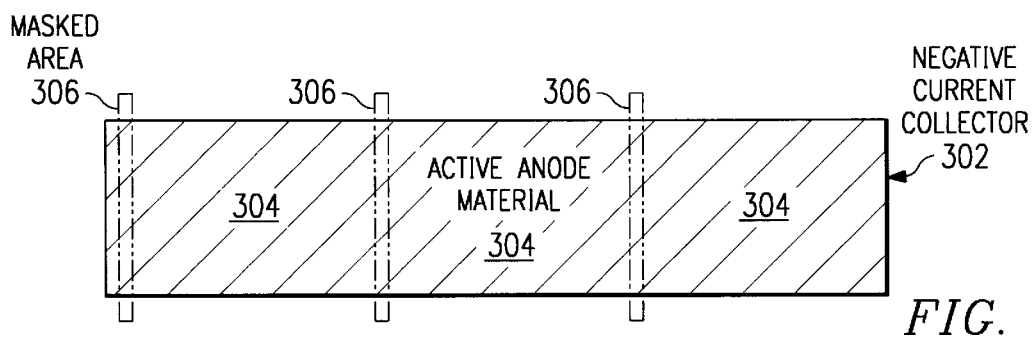
FIG. 3A
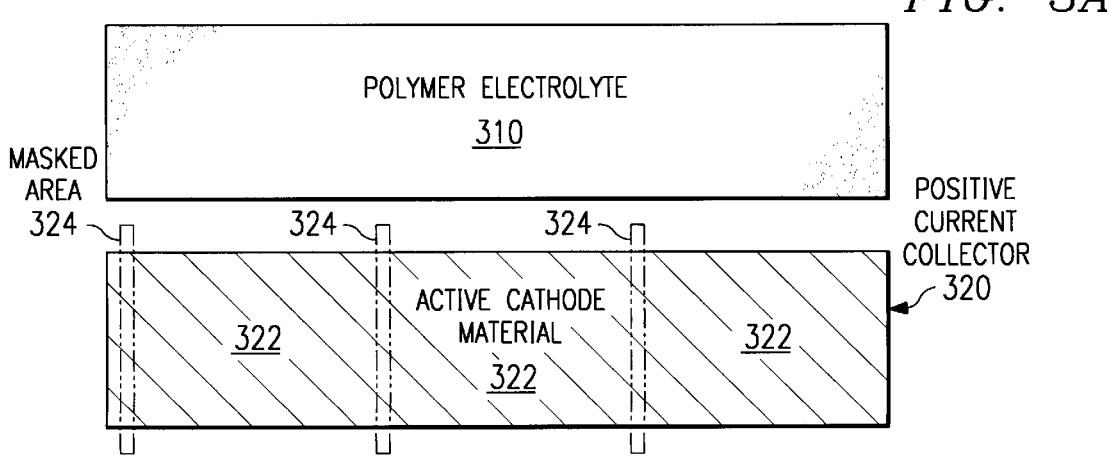

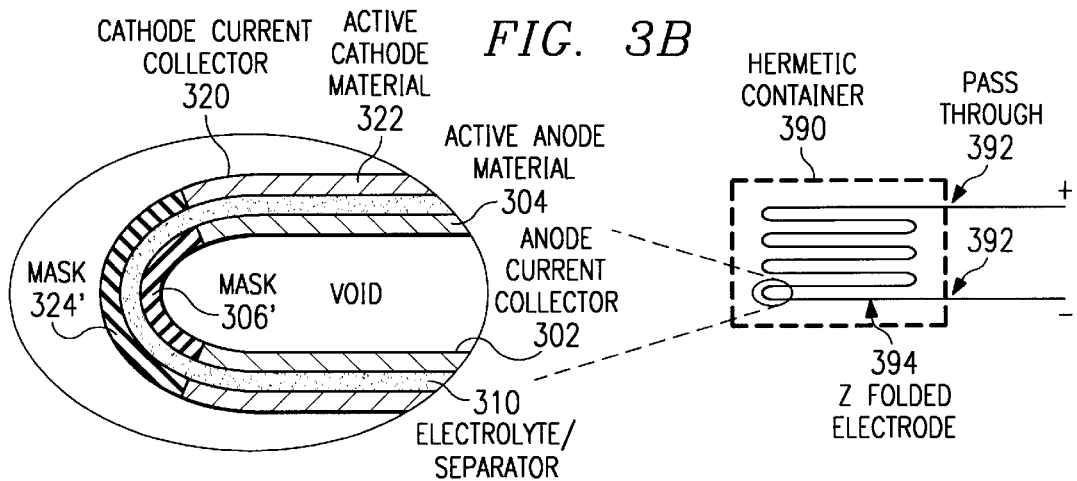
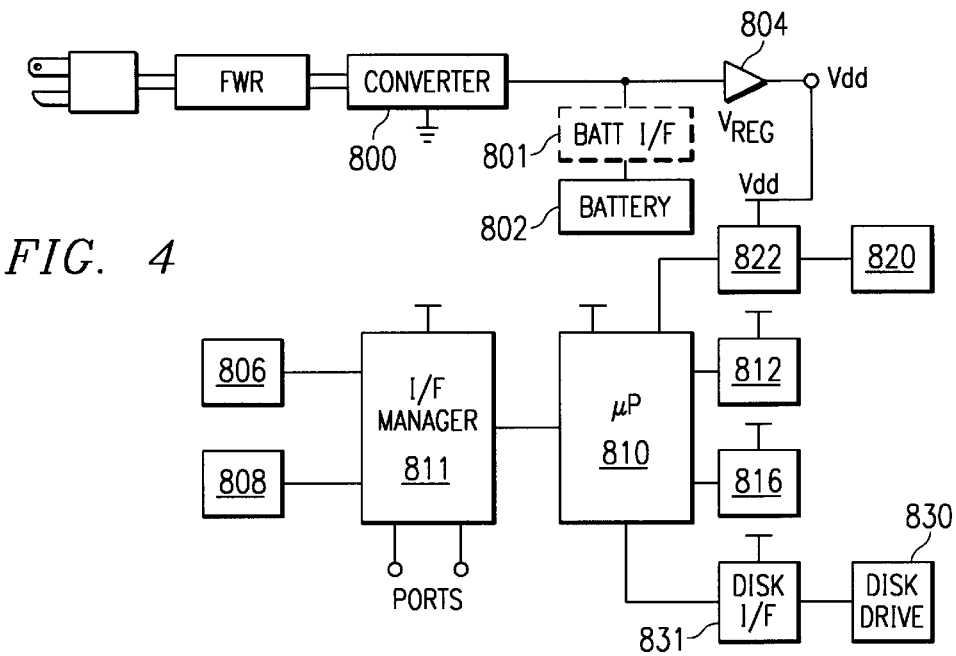
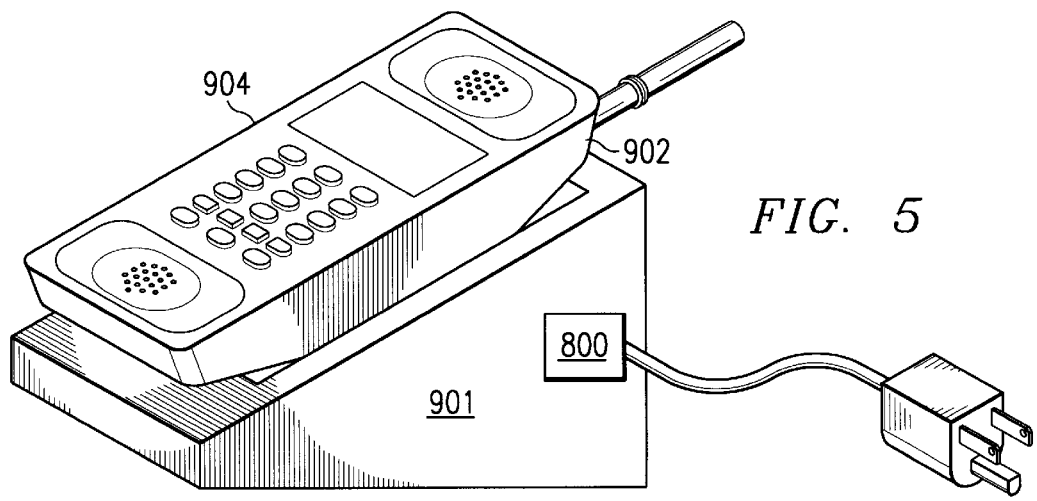

FAN-FOLDED POLYMER-ELECTROLYTE CELL

BACKGROUND AND SUMMARY OF THE INVENTION

The present invention relates to lithium-ion-polymer batteries which have a fan-folded configuration.

Lithium-Ion-Polymer Batteries

One of the promising directions in battery development has been the development of lithium-ion-polymer batteries. Such batteries contain little or no mobile liquid, but instead use a solid polymer or a polymer-stabilized gel as the electrolyte. Since such battery cells are essentially dry, they can be assembled very rapidly with very simple techniques. This is particularly attractive in the case of lithium battery chemistries, which are very attractive due to their high energy density.

FIG. 1 shows a cross-section of a very small area of a lithium-ion-polymer battery. A copper current-collector 102 covers an anode 104 of intercalation material. This anode 104 adjoins the polymer electrolyte 106. The polymer electrolyte 106 may be for example, poly(vinylidene fluoride), loaded with a lithium chlorophosphate salt.

A cathode material 108 lies on the other side of the polymer electrolyte 106. This may be, for example, a $LiMn_2O_4$ spinel.

The cathode is preferably backed with a metallic conductor layer 110. This is preferably made of a metal, such as aluminum, which provides reasonable passivation and mechanical support, as well as good electrical conduction.

The energy stored in a single-layer cell may be relatively small. (If a single-layer cell is to have high power in relation to its energy capacity, it must be thin.) Normally many single-layer cells are welded together in parallel, to make a dense battery with a useful energy density and reasonably high peak current.

One of the key issues in this new technology is packaging. The basic shape of a single electrode+electrolyte layer is flat and very thin. To make useful cells, many such single cells are stacked together and electrically connected inside a hermetic envelope (typically plastic). However, this poses significant problems. The connections for both positive and negative current-carrying elements, in each layer, must be welded together for low resistance and high peak current capability. This requires many welds, which increases cost and loss during manufacturing.

Since low cost is expected to be a key advantage of lithium-ion-polymer cells, cost control is important to the progress of this technology.

Fewer welds also implies a higher energy density, since less of the internal volume of the cell is taken up with the welds.

Additional background on Li-ion-polymer technologies can be found in the 1995 and subsequent volumes of the PROCEEDINGS OF THE SYMPOSIUM ON RECHARGEABLE LITHIUM AND LITHIUM-ION BATTERIES; in the 1995 and subsequent volumes of the SYMPOSIUM ON SOLID STATE IONICS; and in U.S. Pat. Nos. 5,552,239, 5,470,357, and 5,030,523; all of which are hereby incorporated by reference.

Compact Battery Assemblies

Previous attempts have been made to develop simplified manufacturing methods for assembly of flat cells. One of these (developed for cells with metallic lithium, not lithium-ion cells) is a fan-folded assembly technique, as shown in FIG. 2.

In this technique the metal conductor 110, the cathode material 108, and the electrolyte polymer 106 are all formed in a single reel 200 of continuous material. The continuous material is creased along regular lines 210, and is then fan-folded (with concave and convex folds alternating).

Before the fan-folding is completed, sheets of anode material 104 are inserted into the concave portions. Thus the stack 220 which is produced by fan-folding has the following sequence of layers: conductor 110, cathode 108, polymer electrolyte 106, anode 104, polymer electrolyte 106, cathode 108, conductor 110, cathode 108, polymer electrolyte 106, anode 104, polymer electrolyte 106, cathode 108, conductor 110, and so on. This produces a compact stack of multiple cells, which can then be connected in parallel and/or series to produce the desired output voltage and impedance.

However, a problem with this fan-folding technique is that, in a rechargeable battery, the cathode materials will expand and contract slightly, in service, as the battery is charged and discharged. This can produce fatigue effects which shorten the lifetime of the battery unpredictably. It also requires parallel welding of the anode pieces.

Another proposal is seen in U.S. Pat. No. 5,552,239 (which is hereby incorporated by reference), which apparently suggests a spiral-wound (rather than fan-folded) assembly of a strip cell. Other proposals for compact assembly of laminar batteries are found in U.S. Pat. Nos. 4,761,352 and 4,929,519, both of which are hereby incorporated by reference. U.S. Pat. No. 4,761,352 appears to show a structure in which a laminar cell is fan-folded to form a battery. However, the anode and cathode material apparently extends across the fold lines, so the problems at the fold lines would not be avoided (unless extra layers are added to soften the radii of the folds). U.S. Pat. No. 4,929,519 appears to show a structure in which a laminar cell is simply rolled up to form a battery.

Method for Fan-Folding Electrochemical Cells

The present application describes a new method for fabricating polymer cells in a dense fan-folded configuration. To avoid fatigue effects at the folds, the current collectors are made free of active material at the fold locations. This allows a tighter radius curve at the folds, and avoids fatigue when the active materials expand and contract during charge and discharge. Also, the cell requires no intracellular welding.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1 shows a cross-section of a very small area of a lithium-ion-polymer battery.

FIG. 2 shows a prior technique for assembly of a fan-folded stack of battery cells.

FIG. 3A shows the alignment of anode, polymer electrolyte, and cathode layers according to the presently preferred embodiment, and FIG. 3B shows an alternative embodiment of the assembled and fan-folded cell structure.

FIG. 4 shows a block diagram of a portable computer which can use the innovative fan-folded battery.

FIG. 5 shows a portable telephone which can use the innovative fan-folded battery, along with its stand-alone battery charger.

DETAILED DESCRIPTION OF THE PREFERRED EMBODIMENTS

Figure 6:
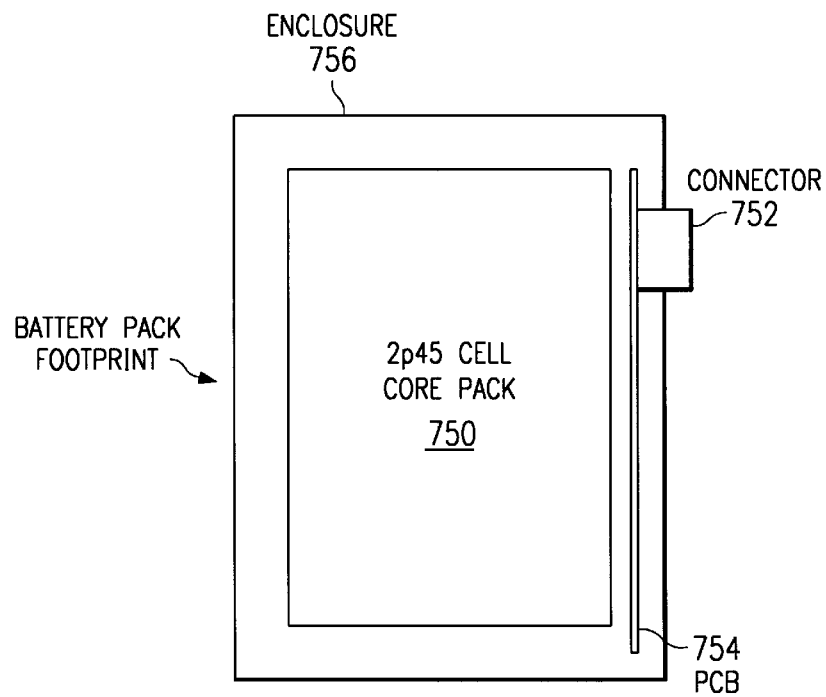
FIG. 6 shows the physical configuration of a smart battery pack which can include the innovative fan-folded battery.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit ANY of the various claimed inventions. Moreover, some statements may apply to some inventive features but not to others.

FIG. 3A shows the alignment of anode, polymer electrolyte, and cathode layers according to the presently preferred embodiment. The three layers shown are shown in alignment, prior to assembly and fan-folding.

The anode active material is preferably applied onto the current collector with a squeegee-type coating process, but of course other processes can be used. A polymeric stabilizer can optionally be combined with the anode active material.

The top portion of FIG. 3A shows the anode structure. A negative current collector 302 is a metallic conductor, such as copper. This collector 302 is coated with areas of anode material 304 (e.g. a lithium intercalation compound). The areas of anode material 304 are separated by bare stripes 306 (where application of the anode material was masked by an insulating polymer such as Kapton).

The polymer electrolyte 310 is simply an unpatterned strip.

The bottom portion of FIG. 3A shows the cathode structure. A positive current collector 320 is a metallic conductor, such as aluminum. This collector 320 is coated with areas of cathode material 322 (e.g. a $LiMn_2O_4$ spinel). The areas of cathode material 322 are separated by bare stripes 324 (where application of the cathode material was masked by an insulating polymer such as Kapton). A polymeric stabilizer can optionally be combined with the cathode active material.

The absence of active anode or cathode material at the folds provides a battery stack which has reduced fatigue at the fold locations.

In this class of embodiments the anode structure and cathode structure are both fan-folded. Preferably both structures are assembled while flat, and then folded up into a stack.

Optionally, creasing or scoring can be used in the current collectors to make sure that the folds occur in the desired locations.

FIG. 3B shows the assembled and fan-folded cell structure. The anode, polymer electrolyte, and cathode layers have the same reference numbers as in FIG. 3A. After the stack of layers has been sealed, it is fan-folded to produce a folded electrode 394, which is then enclosed in a hermetic polymer enclosure 390. Pass-throughs 392 bring the positive and negative leads output through the hermetic container 390.

FIG. 3B also shows a detail view of the arrangement of the layers. Mask 306' (of a nonconductive polymer) passivates the anode material 304 at the point where the structure is folded. Mask 324' similarly passivates the active cathode material 322 at the point where the structure is folded. Electrolyte 310 serves to separate cathode current collector 320 and active cathode material 322 from anode current collector 302 and active anode material 304. In practice, the structure would be compactly folded for maximum density. The void shown in the detail is shown only for clarity, and would ideally not be present in an actual structure.

Note that the masks 306' and 324' are an alternative to the masked areas 306 and 324 shown in FIG. 3A. In either case, the arrangement shown serves to prevent the repeated expansion of the active electrochemical material, which eventually can cause fatigue.

FIG. 4 shows a portable computer including a power converter 800 which is used to charge the battery 802 (which uses a fan-folded cell structure as described above). Optionally, a battery interface 801 is interposed between the battery and the rest of the circuitry. The power converter is connected, through a full-wave bridge rectifier FWR, to draw power from AC mains, and is connected to provide a DC voltage to the battery. The battery 802 (or the converter 800), connected through a voltage regulator 804, is able to power the complete portable computer system, which includes in this example: user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor. Optionally, of course, many other components can be included, and this configuration is not definitive by any means.

FIG. 5 shows a stand-alone battery charger 901, including a power converter 800, which is used to charge the detachable battery module 902 of a mobile telephone 904 which is placed in the rack of the charger 901. In this system embodiment, the battery module 902 is preferably constructed with a fan-folded cell structure as described above.

Figure 7:
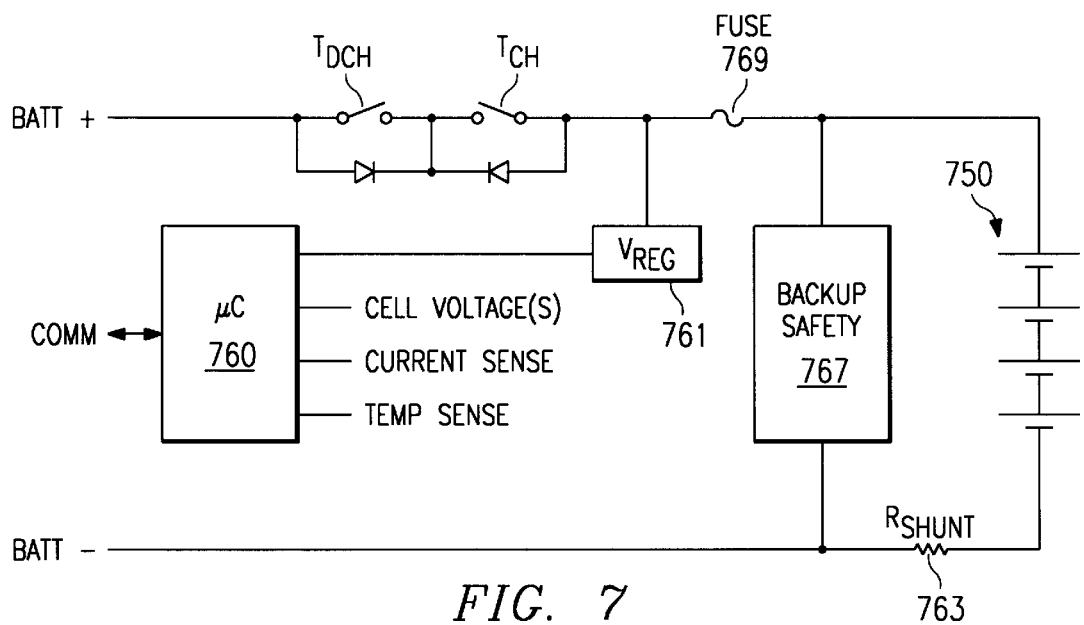
FIG. 7 generally shows the electrical configuration of the smart battery pack of FIG. 6.

FIGS. 6 and 7 show the physical and electrical configuration of a smart battery pack which can advantageously include a battery with a cell structure as described above. (However, of course the innovative cell structures can also be used in many other configurations.) FIG. 6 shows the physical configuration of the smart battery pack. A group of battery cells 750, made in a fan-folded configuration like that of FIG. 3B, is connected to a printed circuit board (PCB) 754, which is connected to an external connector 752. The group of battery cells 750, in this sample embodiment, is made according to the embodiments disclosed above. The board 754 and the cells 750 are protected by enclosure 756, which can be a rigid plastic case or a skin of tough plastic.

FIG. 7 generally shows the electrical configuration of a smart battery pack which can advantageously include a battery with a cell structure as described above. A microcontroller 760 receives various sense inputs, including e.g. battery cell voltage, a temperature sensing input, and a current sensing input (derived from the shunt resistor 763 on the negative side of the cells 750). If more sense inputs are needed, a multiplexer is optionally used to conserve the available ports of the microcontroller. (For example, with a lithium-ion battery it is preferably to monitor the voltage of each cell in a series combination.) The shunt resistor is preferably very small, e.g. about 50 milliohms. The microcontroller 760 also provides communication with host, preferably through a serial bus such as an $I^2C$ bus. A stable power supply for the microcontroller 760 (and other control circuitry) is provided by a small regulator 761. A charging transistor $T_{CH}$ cuts off charging current when it is turned off, and a discharging transistor $T_{CH}$ cuts off discharging current when it is turned off. (Note that the built-in diodes of these two transistors are opposed.) Thus the connector 752 includes not only the current-carrying terminals BATT+ and BATT−, but also the lines for the serial communication bus. This connector can also include connections which allow the microcontroller 760 to discern which bay (of a multi-bay system) the smart battery pack is in, and whether it is currently the active battery pack. A conventional backup safety circuit 767 also monitors total battery voltage, and will blow the fuse 769 if for some reason the microcontroller 760 fails to correct an overcharging situation.

According to a disclosed class of innovative embodiments, there is provided: A method for fabricating a battery structure, comprising the steps of: (a.) assembling and sealing a battery cell which is a continuous strip, and includes a first metallic conductor having a cathode material thereon, with electrochemically inactive locations at regularly spaced fold locations, and includes a second metallic conductor having an anode material thereon; and (b.) folding said continuous strip at said fold locations to make a compact cell structure.

According to a disclosed class of innovative embodiments, there is provided: A method for fabricating a battery structure, comprising the steps of: (a.) assembling and sealing a battery cell which is a continuous strip, and includes a first metallic conductor having a cathode material thereon, and includes a second metallic conductor having a patterned intermittent anode material thereon, with electrochemically inactive locations at regularly spaced fold locations; and (b.) folding said continuous strip at said fold locations to make a compact cell structure.

According to a disclosed class of innovative embodiments, there is provided: A battery structure, comprising: a first folded metal sheet conductor, having thereon a cathode material with intermittent electrochemically inactive locations; a second folded metal sheet conductor, having thereon an anode material with intermittent electrochemically inactive locations; a solid-state electrolyte material interposed between said anode material and said cathode material, to form a sandwich structure; said sandwich structure being fan-folded into a stack in which said first conductor does not touch said second conductor, said stack having plural fold locations which are aligned with said electrochemically inactive locations in anode and/or cathode materials.

According to a disclosed class of innovative embodiments, there is provided: A computer system, comprising: a processor; user input means; output means; and a battery structure comprising a first folded metal sheet conductor, having a cathode material patterned thereon with intermittent electrochemically inactive locations; a second folded metal sheet conductor, having an anode material patterned thereon with intermittent electrochemically inactive locations; a solid-state electrolyte material interposed between said anode material and said cathode material, to form a sandwich structure; said sandwich structure being fan-folded into a stack in which said first conductor does not touch said second conductor, said stack having plural fold locations which are aligned with said electro-chemically inactive locations in anode and/or cathode materials.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

As battery electrochemists will recognize, a variety of material compositions can be used for the electrolyte, anode, and cathode.

The disclosed battery cell structure and assembly methods are not only applicable to small batteries, but are also expected to be applicable to larger rechargeable batteries, especially in the range of 3–100 kilograms, for use in electric vehicle applications.

In alternative embodiments, the innovative power architecture can be integrated with other portable electronics.

What is claimed is:

1. A method for fabricating a battery structure, comprising the steps of:

(a.) assembling and sealing a battery cell which is a continuous strip, and includes a first metallic conductor having a cathode material thereon, said cathode material having electrochemically inactive locations at regularly spaced fold locations, and includes a second metallic conductor having an anode material thereon; and (b.) folding said continuous strip at said fold locations to make a compact cell structure, wherein said anode material is passivated by an overcoat at said electrochemically inactive locations.

2. The method of claim 1, wherein said anode material is a lithium-ion intercalation structure.

3. The method of claim 1, wherein said cathode material is patterned, and said electrochemically inactive locations are gaps in said cathode material.

4. The method of claim 1, wherein said cathode material is a $LiMn_2O_4$ spinel.

5. The method of claim 1, wherein said first conductor is aluminum.

6. The method of claim 1, wherein said second conductor is copper.

7. The method of claim 1, further comprising the subsequent step of sealing said cell structure into a hermetic container.

8. A method for fabricating a battery structure, comprising the steps of:

(a.) assembling and sealing a battery cell which is a continuous strip, and includes a first metallic conductor having a cathode material thereon, and includes a second metallic conductor having a patterned intermittent anode material thereon, said anode material having electrochemically inactive locations at regularly spaced fold locations; and (b.) folding said continuous strip at said fold locations to make a compact cell structure, wherein said anode material is passivated by an overcoat at said electrochemically inactive locations.

9. The method of claim 8, wherein said anode material is a lithium-ion intercalation structure.

10. The method of claim 8, wherein said anode material is patterned, and said electrochemically inactive locations are gaps in said anode material.

11. The method of claim 8, wherein said cathode material is a $LiMn_2O_4$ spinel.

12. The method of claim 8, wherein said first conductor is aluminum.

13. The method of claim 8, wherein said second conductor is copper.

14. The method of claim 8, further comprising the subsequent step of sealing said cell structure into a hermetic container.

* * * * *